United States Patent
Usikov

(10) Patent No.: US 9,916,497 B2
(45) Date of Patent: Mar. 13, 2018

(54) AUTOMATED EMBEDDING AND BLENDING HEAD IMAGES

(71) Applicant: Sony Corporation, Tokyo (JP)

(72) Inventor: Daniel Usikov, Newark, CA (US)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 14/814,627

(22) Filed: Jul. 31, 2015

(65) Prior Publication Data

US 2017/0034453 A1 Feb. 2, 2017

(51) Int. Cl.
*G06K 9/20* (2006.01)
*G06K 9/00* (2006.01)
*G06T 7/11* (2017.01)

(52) U.S. Cl.
CPC ..... *G06K 9/00362* (2013.01); *G06K 9/00234* (2013.01); *G06T 7/11* (2017.01); *G06T 2207/20124* (2013.01); *G06T 2207/30201* (2013.01)

(58) Field of Classification Search
CPC .......... G06T 2207/30201; G06T 2207/20132; G06K 9/00362; G06K 9/0024; H04N 5/272
See application file for complete search history.

(56) References Cited

U.S. PATENT DOCUMENTS

| 6,351,265 B1* | 2/2002 | Bulman ................. G06T 11/60 345/660 |
| 8,482,635 B2 | 7/2013 | Peters et al. |
| 2008/0019575 A1 | 1/2008 | Scalise et al. |
| 2010/0027961 A1* | 2/2010 | Gentile ..................... G06T 5/50 386/278 |
| 2010/0245382 A1* | 9/2010 | Sio ......................... G06T 13/80 345/593 |
| 2010/0266207 A1* | 10/2010 | Zhang ..................... H04N 5/262 382/195 |
| 2012/0177288 A1 | 7/2012 | Chaussat et al. |
| 2012/0182315 A1* | 7/2012 | Garzo ..................... G06T 11/60 345/635 |
| 2015/0235087 A1* | 8/2015 | Bigioi ............... G06K 9/00624 382/103 |

OTHER PUBLICATIONS

Jean-Francois Lalonde et al., "Photo clip Art, Carnegie Mellon University, Research Showcase, Robotics Institute, School of Computer Science, 2007, Paper 281, pp. 1-10, http://respository.cmu.edu/robotics/281.

(Continued)

*Primary Examiner* — Phuoc Tran
(74) *Attorney, Agent, or Firm* — Haverstock & Owens LLP

(57) ABSTRACT

An automated process of transferring an object (e.g., the head with hair) from an image into another image, or to a different location in the same image is described. The implementation is a comprehensive and fully automated approach enabling the object's transfer without intermediate intervention and support from the user. The process automates both steps: the object's delineation, and its blending into the new background as well.

21 Claims, 22 Drawing Sheets

(56) References Cited

OTHER PUBLICATIONS

Volker Blanz et al., "Exchanging Faces in Images", Max-Planck-Institut Fur Informatik, Saarbucken, Germany, University of Basel, Department Informatik, Basel, Switzerland, The Eurographics Association and Blackwell Publishing, 2004/M.-P. Cani and M. Slater, (Guest Editors), 2004, vol. 23, No. 3.

Arnaud Jacquin et al., "Automatic location tracking of faces and facial features in video sequences", Proceedings, International Workshop on Automatic Face and Gesture Recognition, Zurich, Switzerland, Jun. 1995, pp. 1-7, AT &T Bell Laboratories Single Processing Research Department, 600 Mountain Avenue, Murray Hill, NJ 07974, USA.

* cited by examiner

AUTOMATED EMBEDDING AND BLENDING HEAD IMAGES

FIELD OF THE INVENTION

The present invention relates to image processing. More specifically, the present invention relates to automated image processing.

BACKGROUND OF THE INVENTION

In popular photo-editing tools, to move an object (such as a head) from one place to another, the user conducts tedious manual work of delineating the head with all its hair curls. Next, the user performs a complicated job of blending the extracted object into a new background. These steps are difficult and time-consuming.

In the existing approaches to the head-object delineation from an image (usually a photo), and the subsequent transferring into a different image, requires the user intervention in both stages: first, with the guiding for the delineation process, and, secondly, optimizing the embedding of the object into a new background.

SUMMARY OF THE INVENTION

An automated process of transferring an object (e.g., the head with hair) from an image into another image, or to a different location in the same image is described. The implementation is a comprehensive and fully automated approach enabling the object's transfer without intermediate intervention and support from the user. The process automates both steps: the object's delineation, and its blending into the new background as well.

In one aspect, a method of automatically transferring an object from a first location to a second location programmed in a non-transitory memory of a device comprises automatically delineating the object including recognizing a hairless portion of the object, followed by delineating a whole hair area; and automatically blending the object into a new background. The hairless portion of the object includes a face and a neck area. Recognizing the hairless portion of the object includes determining positions of eyes, nose, mouth and chin to separate a face-neck area from a hair area. Delineating the object includes identifying a hair area by conducting calculations from a face-neck area outward. Delineating the object includes repeatedly modifying a hair template to adjust to local hair properties. Delineating the object includes continuing hair recognition steps until a whole extent of hair, including hair curls, is found. Blending the object into the new background includes utilizing a hair mask. Blending the object into the new background includes smoothing the hair mask.

In another aspect, a system for automatically transferring an object from a first location to a second location programmed in a non-transitory memory of a device comprises an acquiring device configured for acquiring an image and a processing device configured for automatically delineating the object including recognizing a hairless portion of the object and automatically blending the object into a new background to generate a modified image and a display device configured for displaying the modified image. The hairless portion of the object includes a face and a neck area. Recognizing the hairless portion of the object includes determining positions of eyes, nose, mouth and chin to separate a face-neck area from a hair area. Delineating the object includes identifying a hair area by conducting calculations from a face-neck area outward. Delineating the object includes repeatedly modifying a hair template to adjust to local hair properties. Delineating the object includes continuing hair recognition steps until a whole extent of hair, including hair curls, is found. Blending the object into the new background includes utilizing a hair mask. Blending the object into the new background includes smoothing the hair mask.

In another aspect, an apparatus comprises a non-transitory memory for storing an application, the application for: automatically delineating an object including recognizing a hairless portion of the object and automatically blending the object into a new background to generate a modified image, a processing component coupled to the memory, the processing component configured for processing the application and a display device configured for displaying the modified image. The hairless portion of the object includes a face and a neck area. Recognizing the hairless portion of the object includes determining positions of eyes, nose, mouth and chin to separate a face-neck area from a hair area. Delineating the object includes identifying a hair area by conducting calculations from a face-neck area outward. Delineating the object includes repeatedly modifying a hair template to adjust to local hair properties. Delineating the object includes continuing hair recognition steps until a whole extent of hair, including hair curls, is found. Blending the object into the new background includes utilizing a hair mask. Blending the object into the new background includes smoothing the hair mask.

DETAILED DESCRIPTION OF THE PREFERRED EMBODIMENT

Figure 1:
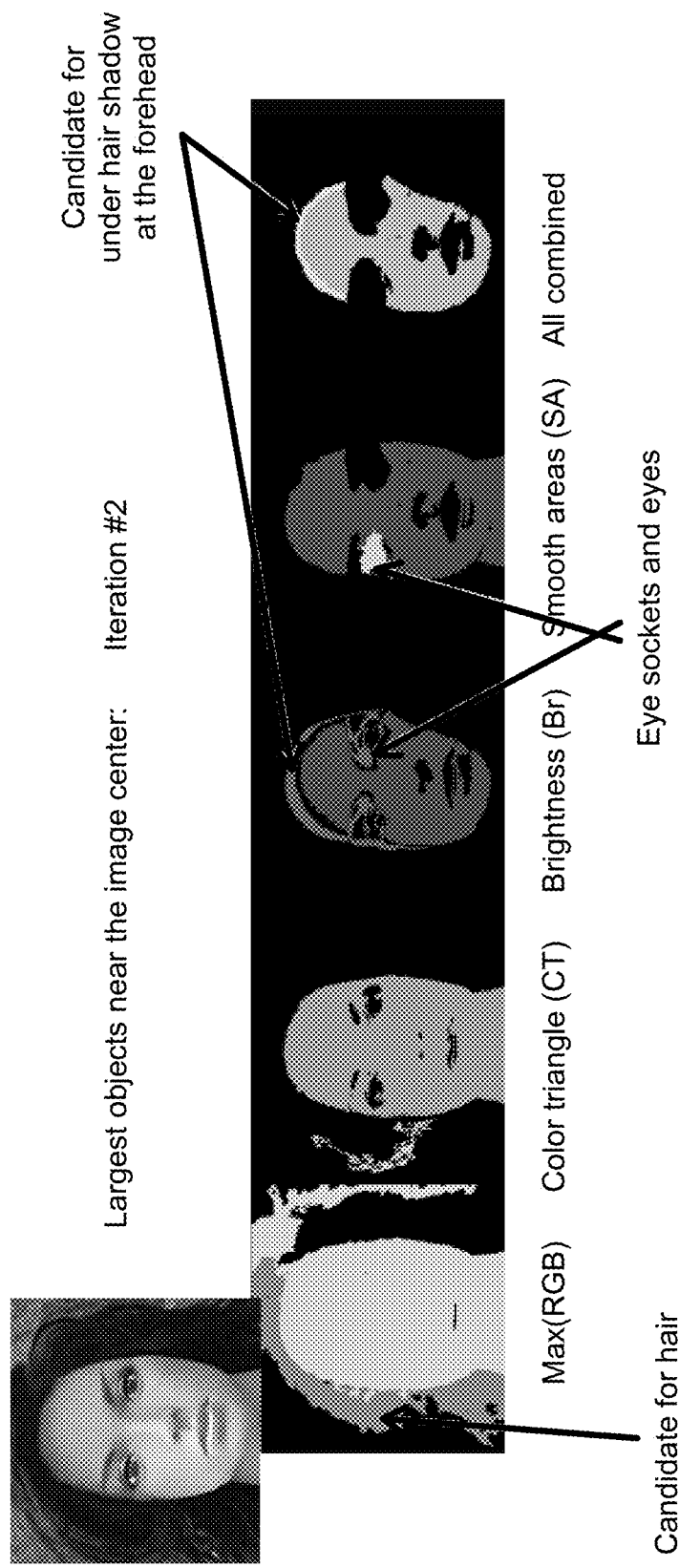
FIGS. 1-9 illustrate a sequence of shapes to be analyzed for subobject labeling according to some embodiments.

An automated process of transferring an object (e.g., the head with hair) from an image into another image, or to a different location in the same image is described. In some embodiments, the new location for the object is manually selected by a user (e.g., by clicking with a mouse or pointing with a touchscreen), or the new location is determined automatically. The implementation is a comprehensive and fully automated approach enabling the object's transfer without intermediate intervention and support from the user. The process automates both steps: the object's delineation, and its blending into the new background as well.

The head-hair delineation process starts with recognition of the hairless portion of the head: face and neck, sometimes the shoulders as well. The face-neck area are thoroughly delineated. The positions of eyes, nose, mouth, chin are found in the process and used to separate the open face-neck areas from the hair area. The hair is a highly articulated object that might have a very different shape, color and brightness between individuals and often varies across the hair area of each individual as well. So, to start identifying the hair area, the calculations are conducted from the face-neck area outward. The hair portion in the immediate vicinity of the open face-neck area is less articulated and is used as a first-approach hair template describing the hair properties such as color, brightness, texture. Based on the estimated hair properties, the next imaging methods analyze the hair continuity by moving outward from the face area. In the progress, the hair template is constantly modified to adjust to the local hair properties. The hair recognition steps continue until the whole extent of the hair, including hair curls (if they exist) of different size and thickness, is found. Starting the hair recognition from the face and moving outward helps to orderly handle the local geometrical and color-brightness variations.

The hair finding process stops when one or more criteria for a pixel as belonging to the hair area is not-fulfilled. The criteria include:

Above a threshold change from the allowed hair color-brightness on a boundary with the background objects;

Above a threshold change in the allowed hair texture;

Above a threshold change in the allowed hair geometry (for example, a hair curl is too straight or too long).

The final step of head-hair delineation takes care of the semitransparent areas of the hair. Normally they are located at the periphery where the hair density diminishes and the color of background objects blends with hair color. In these areas, the algorithm collects color and brightness of the background and uses this knowledge when the extracted head with its hair have to be embedded into a new background. A special calculation is conducted eliminating the color mixture of the old background and recalculating to the new background to achieve the best blending result. The blending procedure also includes a spatial smoothing on the boundary between hair and new background.

Hair Blending

When hair curls vividly stick out, a two-step process is utilized:

1. Generate a mask for the extended hair regions
2. Blend the hair under the mask into the new background Head and Hair Finding Segmentation Several image segmentation methods are used to find the head-hair area. The found super-pixels of each segmentation methods are used by a decision-making procedure to find the exact position of the hair area. First, the decision-making process sorts the super pixels by their size. Then, a set of largest super pixels (~100) is used for the next steps. Second, the largest super-pixels are sorted by their distance from the head center. Third, the super-pixels are classified by their color, brightness, smoothness in three classes: i) face-neck area, 2) hair area, 3) background. Finally, the remaining (small) super-pixels are classified by their belonging to the classes. The exact hair area is calculated.

Features useful for the exact finding of the hair area:

1) eyes and nose position to understand the head orientation and the respected hair allocation;

2) distribution of shadows on the face to identify the light location and the respected brightness variety of the hair area;

3) components of the hair areas as they come from different segmentation methods to identify the color-brightness variety in the hair area.

Explanation to Segmentation Example

Four segmentation methods are used in the examples that follow. Shown is the sequence of 10 largest super-pixels for each segmentation method, sorted by the distance from the center of the face.

Max(RGB)-based method classifies pixels by their belonging to reddish, greenish, bluish hue;

Color triangle-based method classifies pixels by their color only (brightness is not counted);

Brightness-based classifies pixels into groups based on their absolute brightness;

Smoothness-based method classifies pixel by the degree of smoothness of their surrounding area.

Major Objects Helping in Hair-Segmentation

Eyes and nose position to understand the head orientation and the respected hair allocation;

Distribution of shadows on the face to identify the light location and the respected brightness variety of the hair area;

Components of the hair areas as they come from different segmentation methods to identify the color-brightness variety in the hair area.

Figure 2:
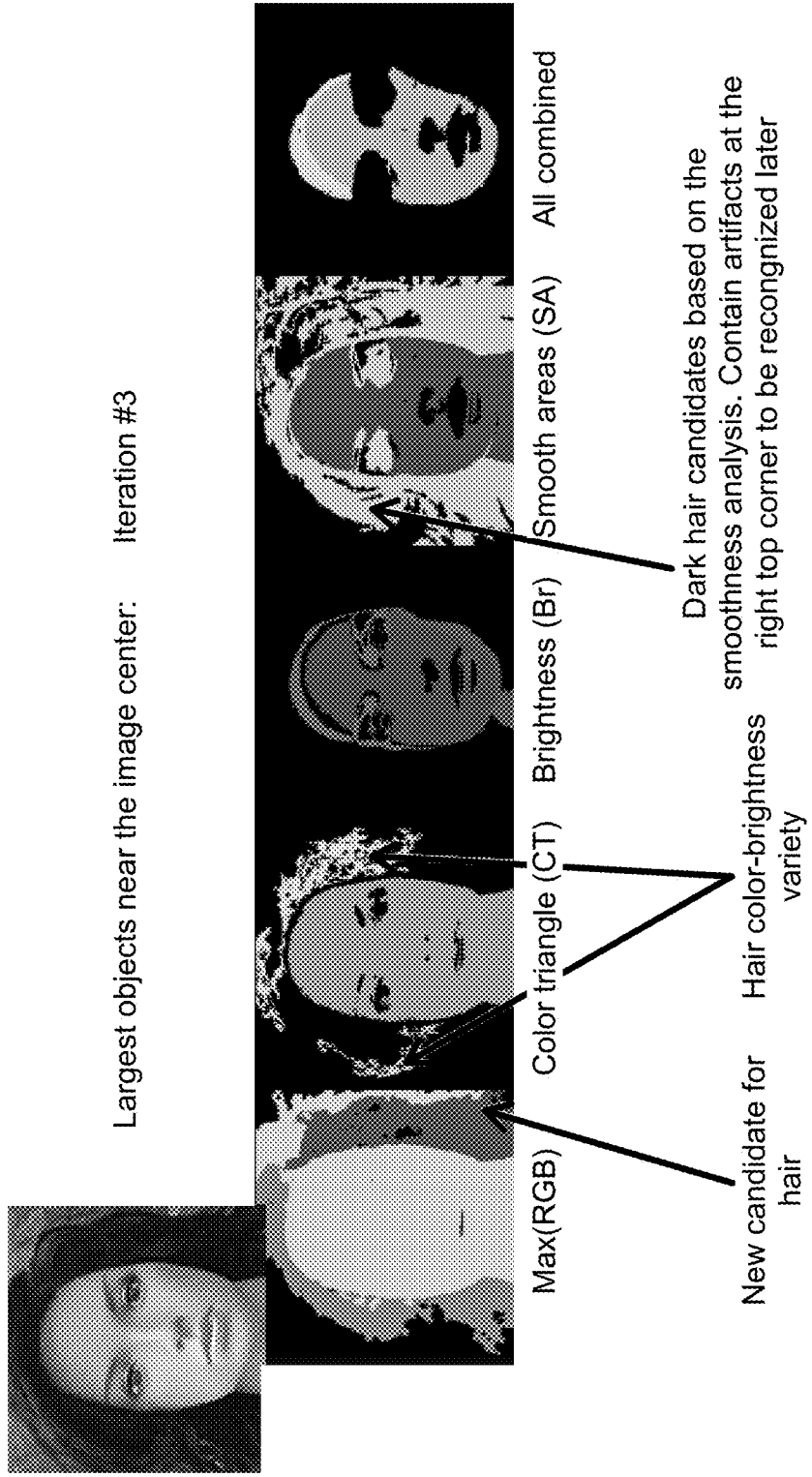
Figure 3:
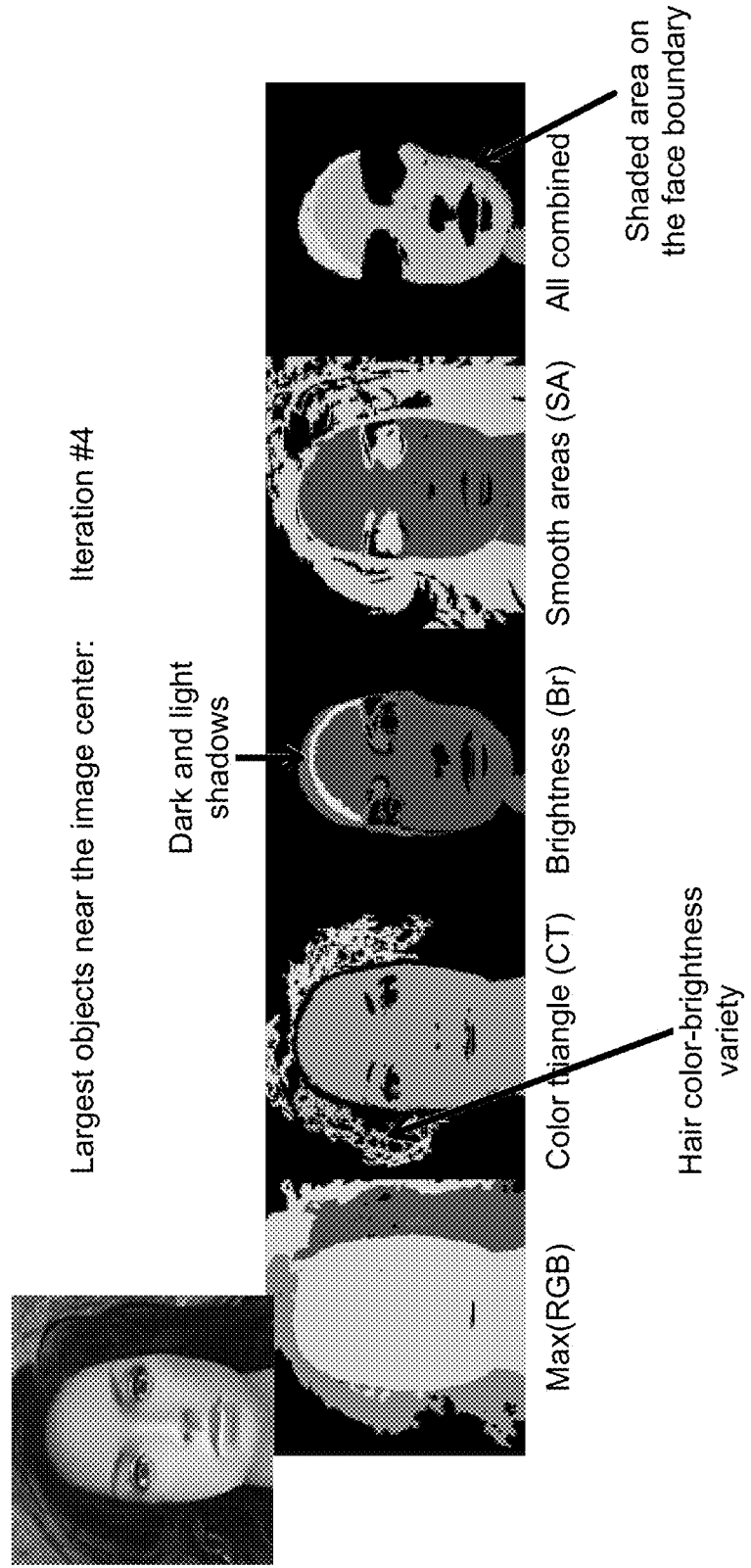
Figure 4:
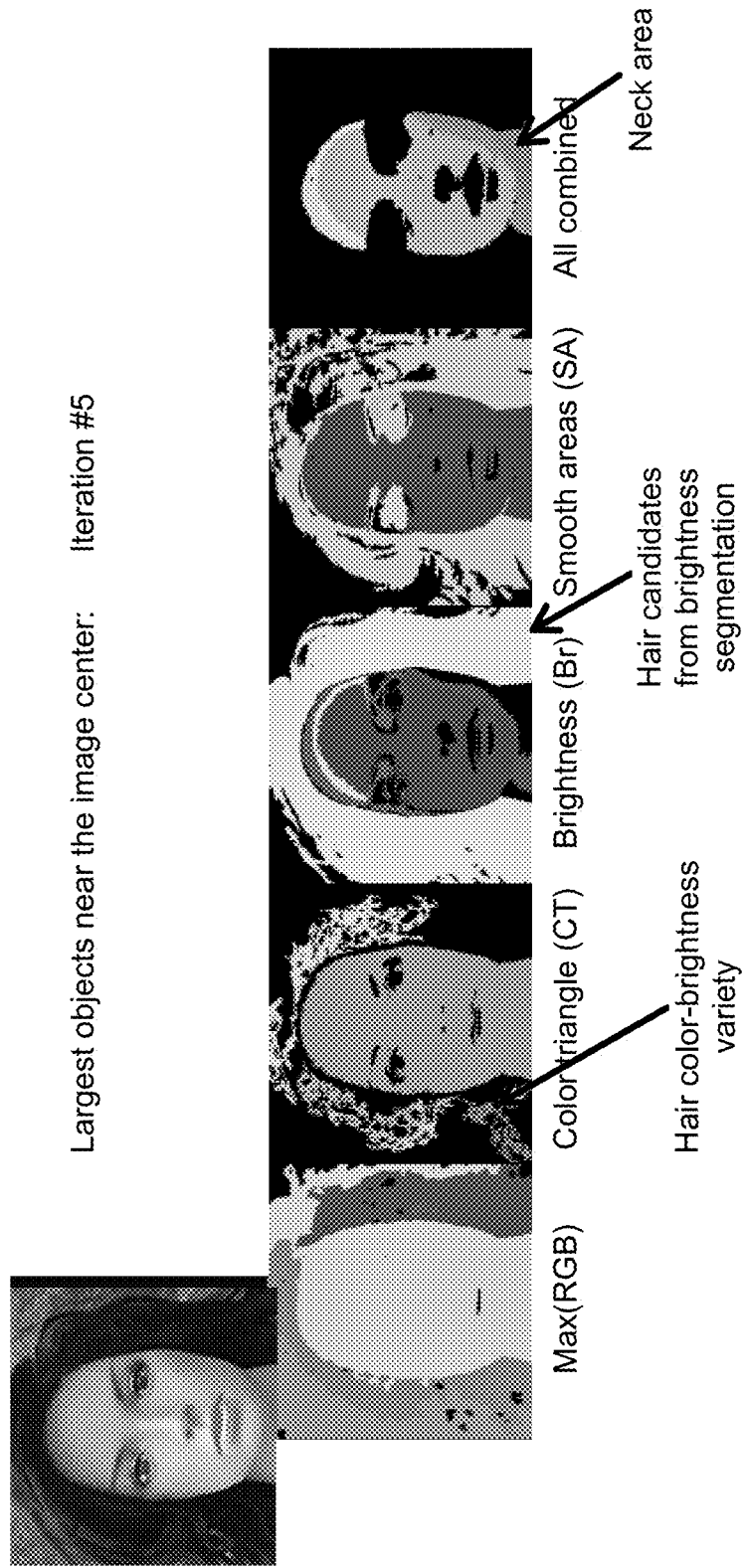
Figure 5:
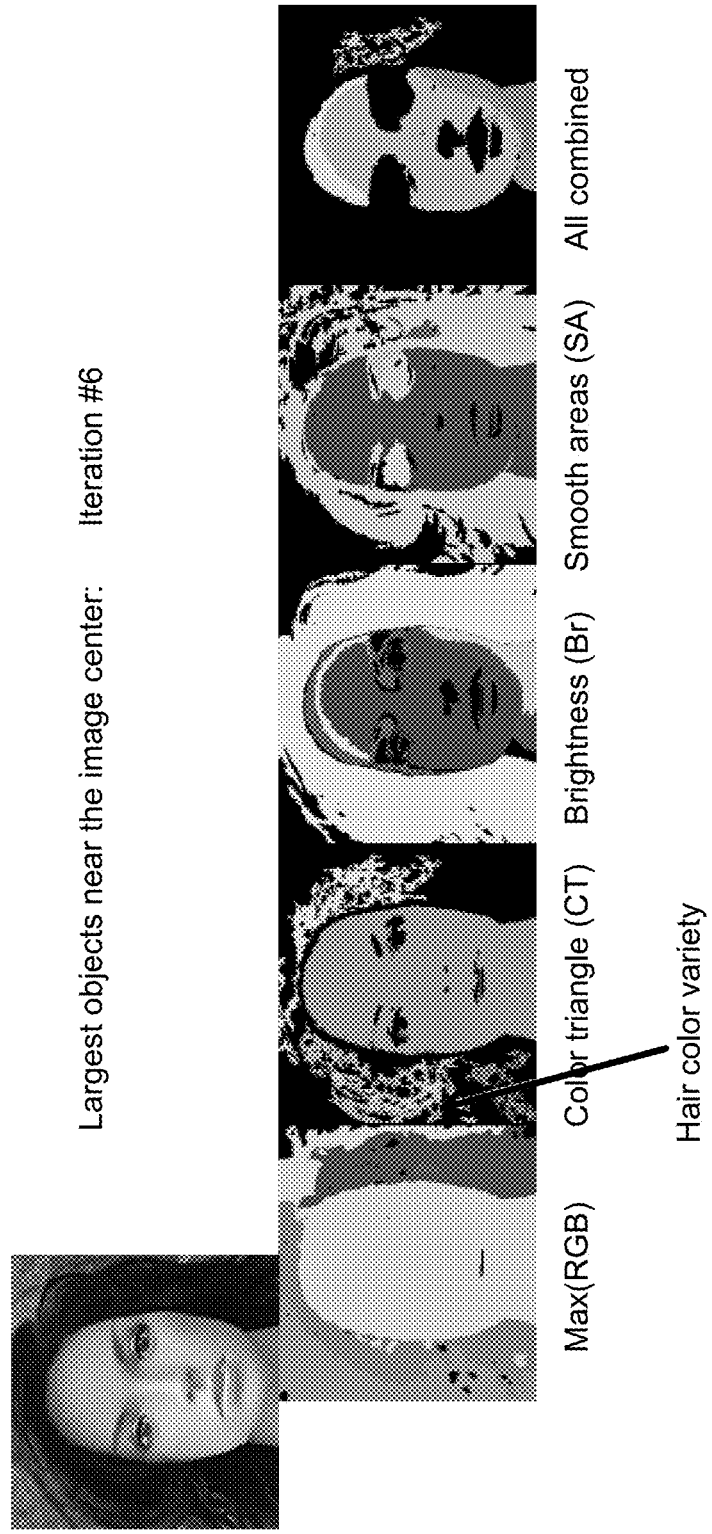
Figure 6:
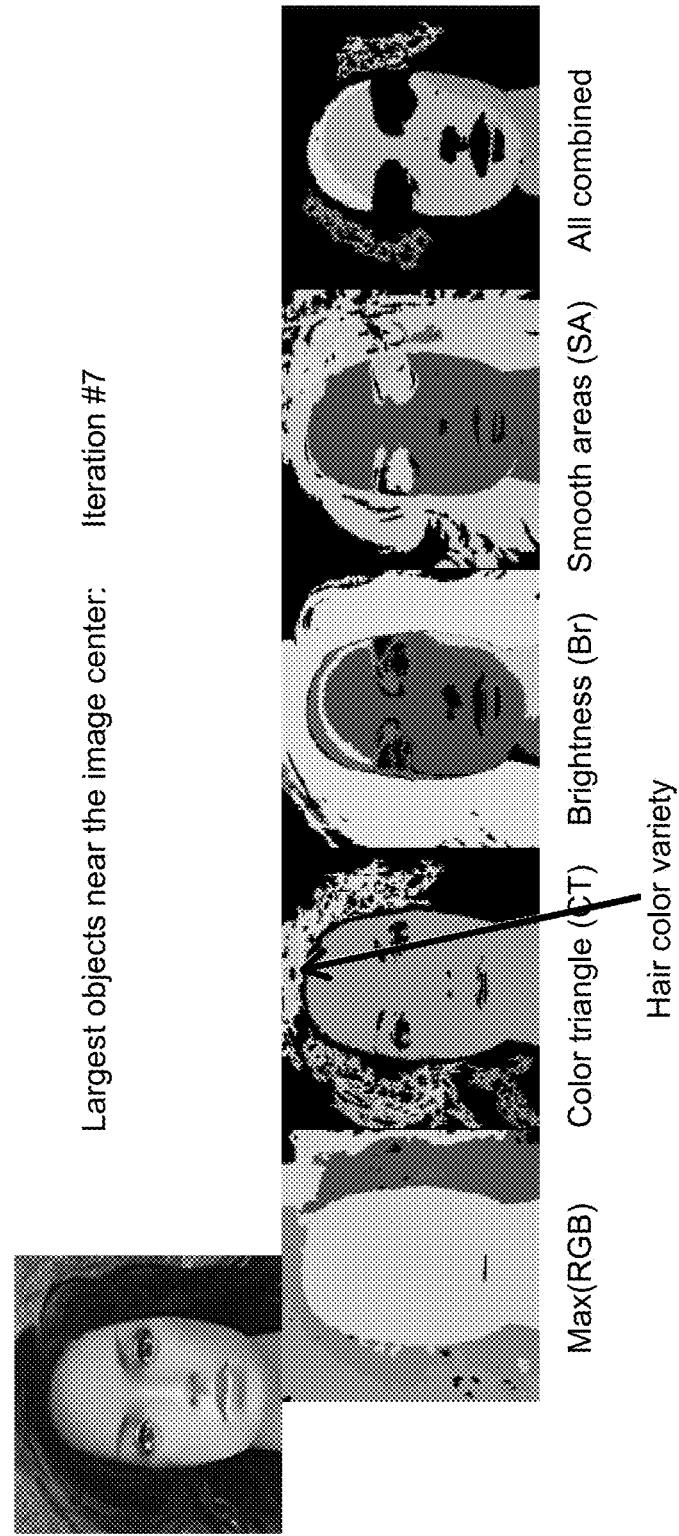
Figure 7:
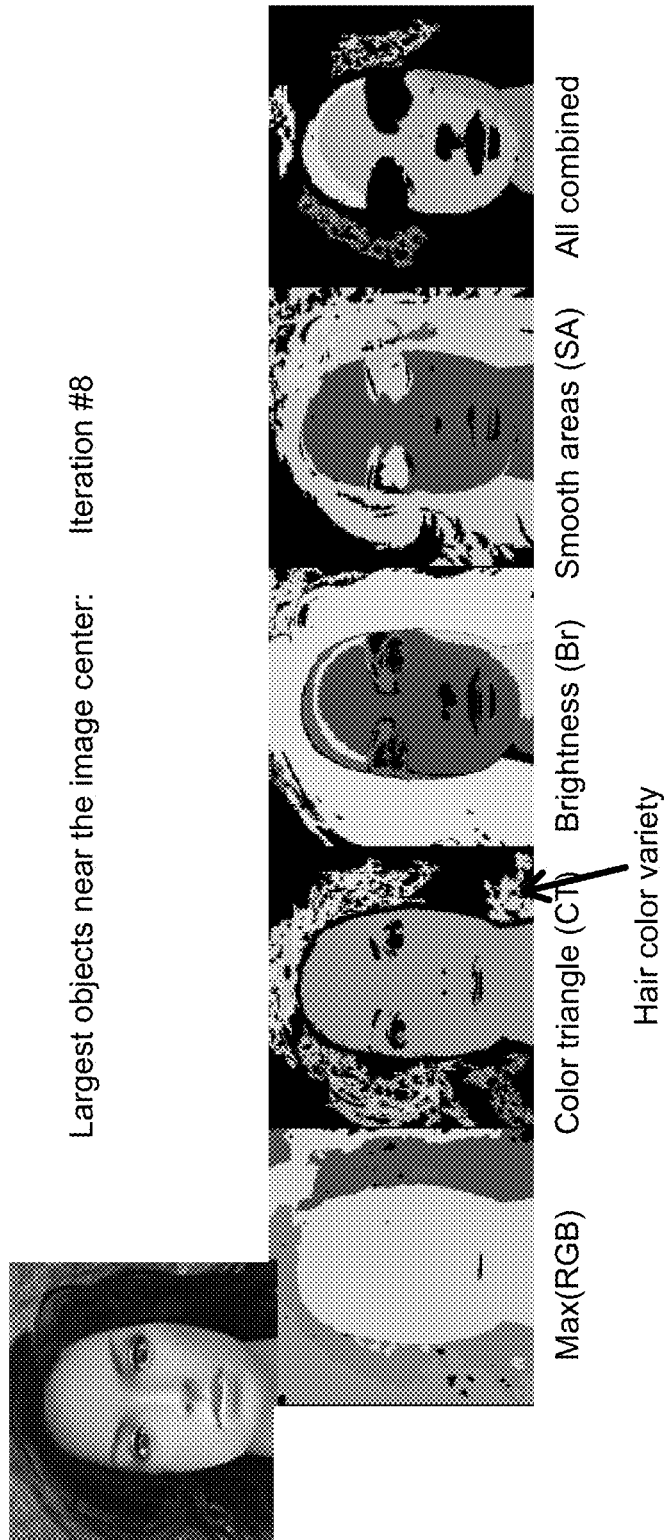
Figure 8:
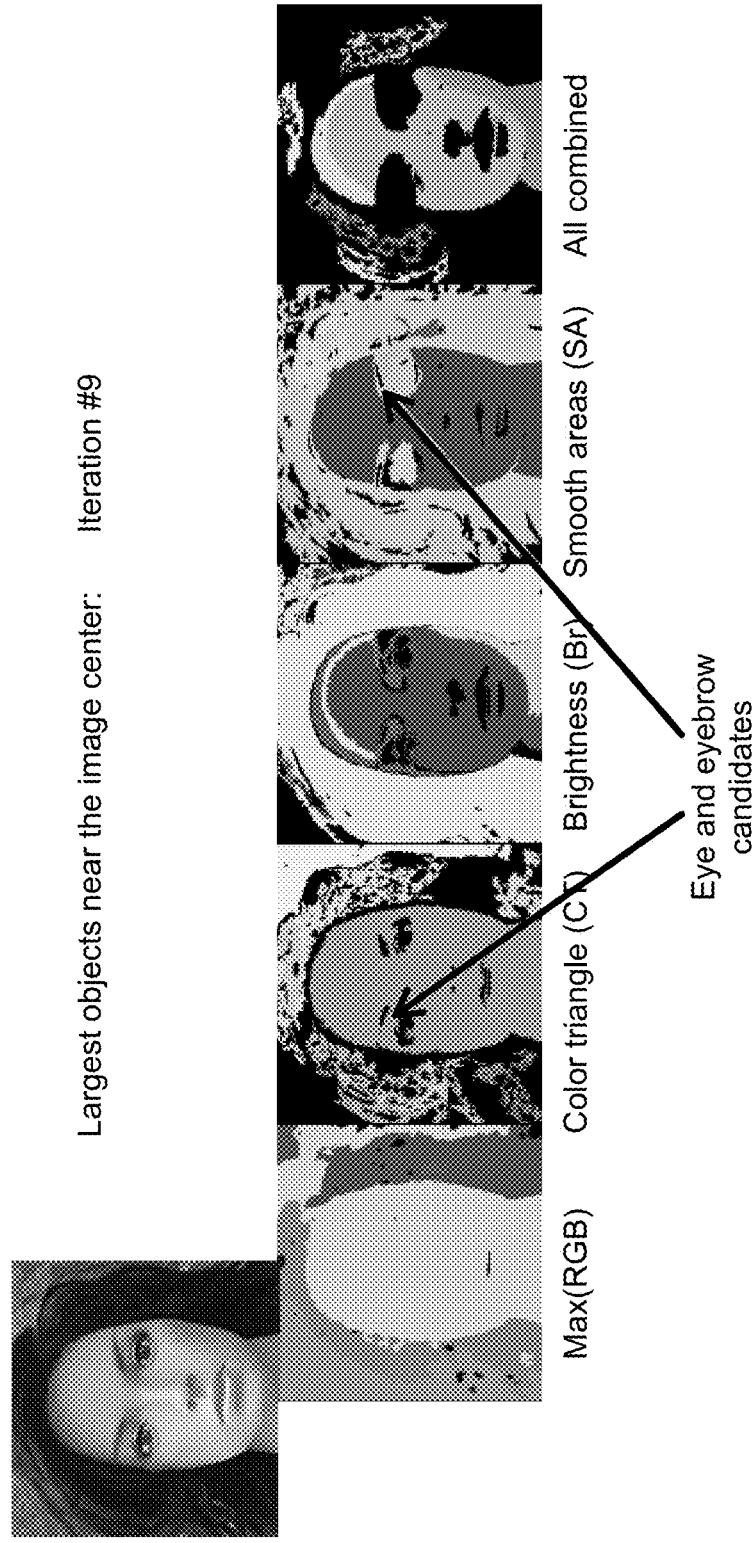
Figure 9:
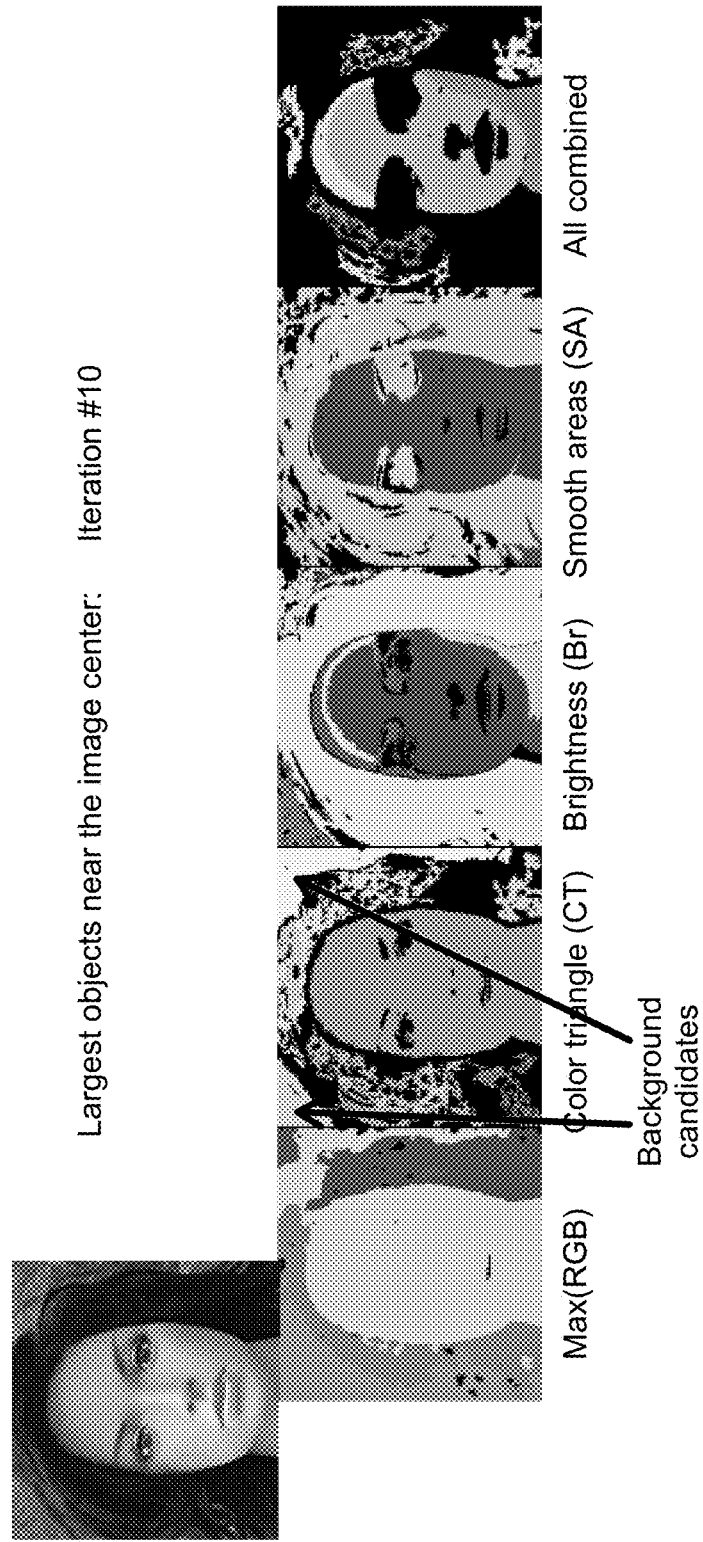

FIGS. 1-9 illustrate a sequence of shapes to be analyzed for subobject labeling according to some embodiments. In FIG. 1, a candidate for hair, eye sockets and eyes, and a candidate for under hair shadow at the forehead are analyzed. In FIG. 2, a new candidate for hair, hair color-brightness variety and dark hair candidates based on the smoothness are analyzed. In FIG. 3, hair color-brightness variety, dark and light shadows and shaded area on the face boundary are analyzed. In FIG. 4, hair color-brightness variety, hair candidates from brightness segmentation and neck area are analyzed. In FIG. 5, hair color variety is analyzed. In FIG. 6, hair color variety is analyzed. In FIG. 7, hair color variety is analyzed. In FIG. 8, eye and eyebrow candidates are analyzed. In FIG. 9, background candidates are analyzed.

Figure 10:
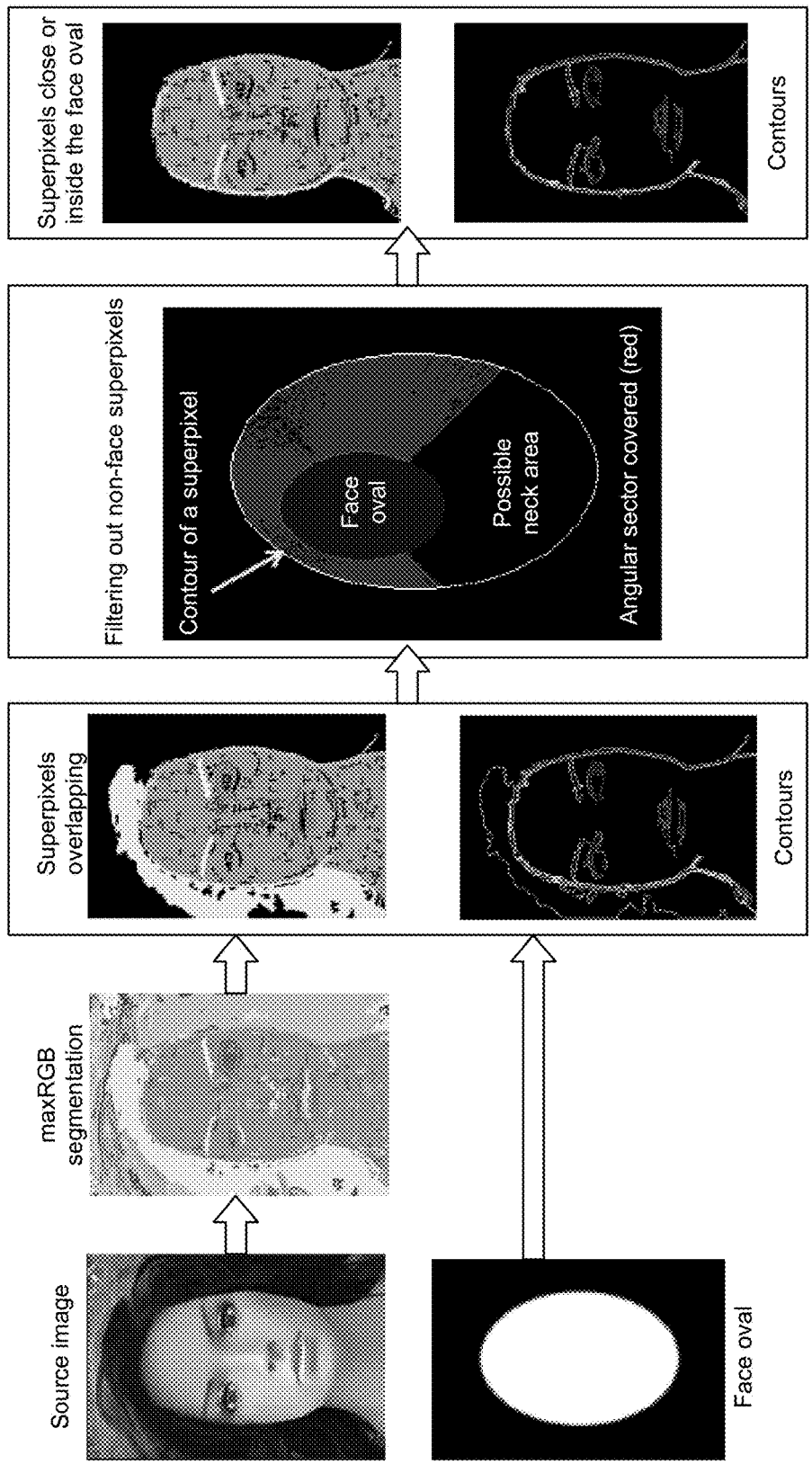
FIG. 10 illustrates a diagram of the method of defining superpixels in the face area according to some embodiments.

FIG. 10 illustrates a diagram of the method of defining superpixels in the face area according to some embodiments. A source image and a face oval mask are input. Max RGB segmentation is implemented. Overlapping superpixels are determined. Non-face superpixels are filtered out. Superpixels close or inside the face oval are determined.

When moving a head image into a different background, finding and blending of thin, often semitransparent hair curls is difficult. To solve the issue, the exact location of outer hair curls is found, the color signature of the background in the vicinity of the curls is determined, the color of the semitransparent curls from the brightness and the hue of the old background into the brightness and hue of the new background are transformed. Blending is smoothed.

Figure 11:
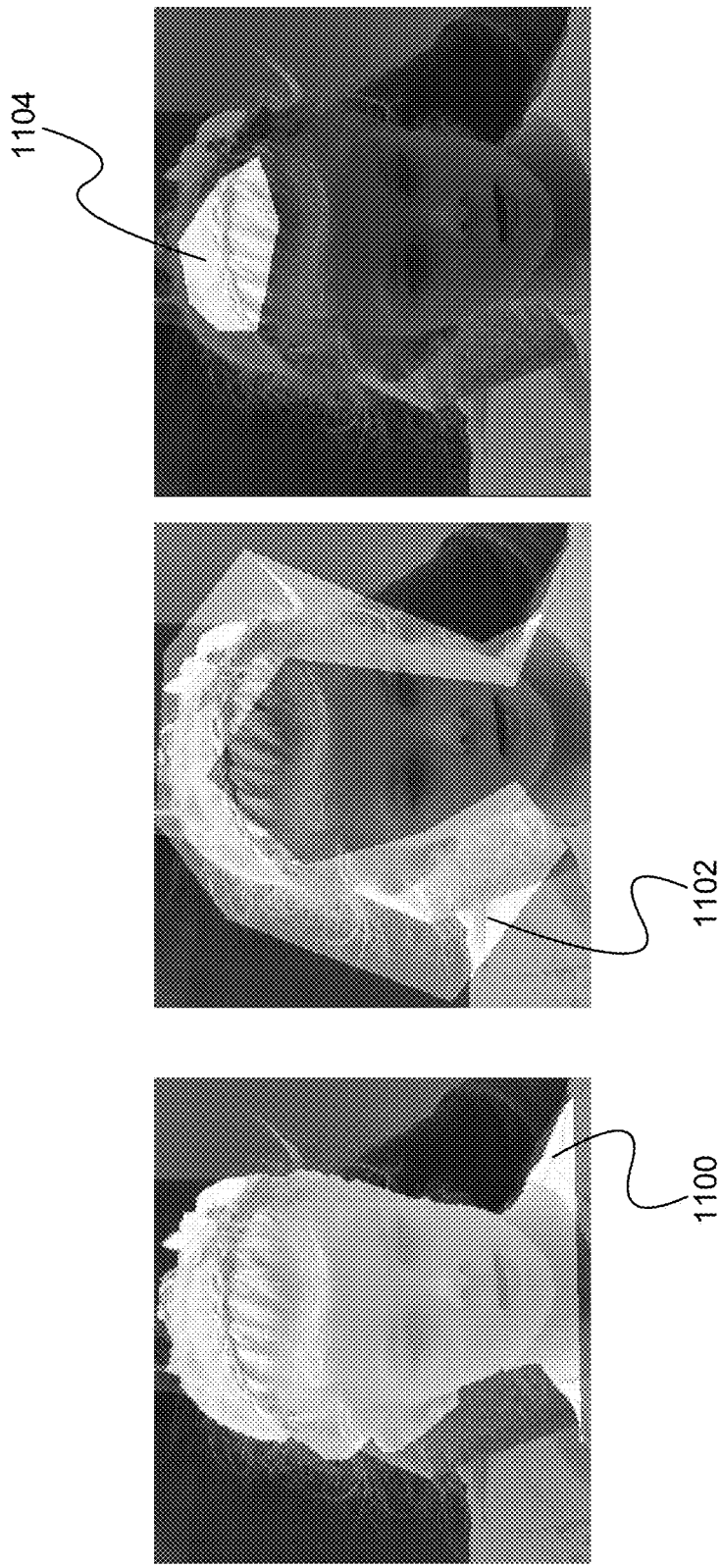
FIG. 11 illustrates three masks used for extended hair embedding according to some embodiments.

FIG. 11 illustrates three masks used for extended hair embedding according to some embodiments. The first mask 1100 crops the objects with cut-off curls. The second mask 1102 is for the expected curl area. The third mask 1104 is for the hair color.

Figure 12:
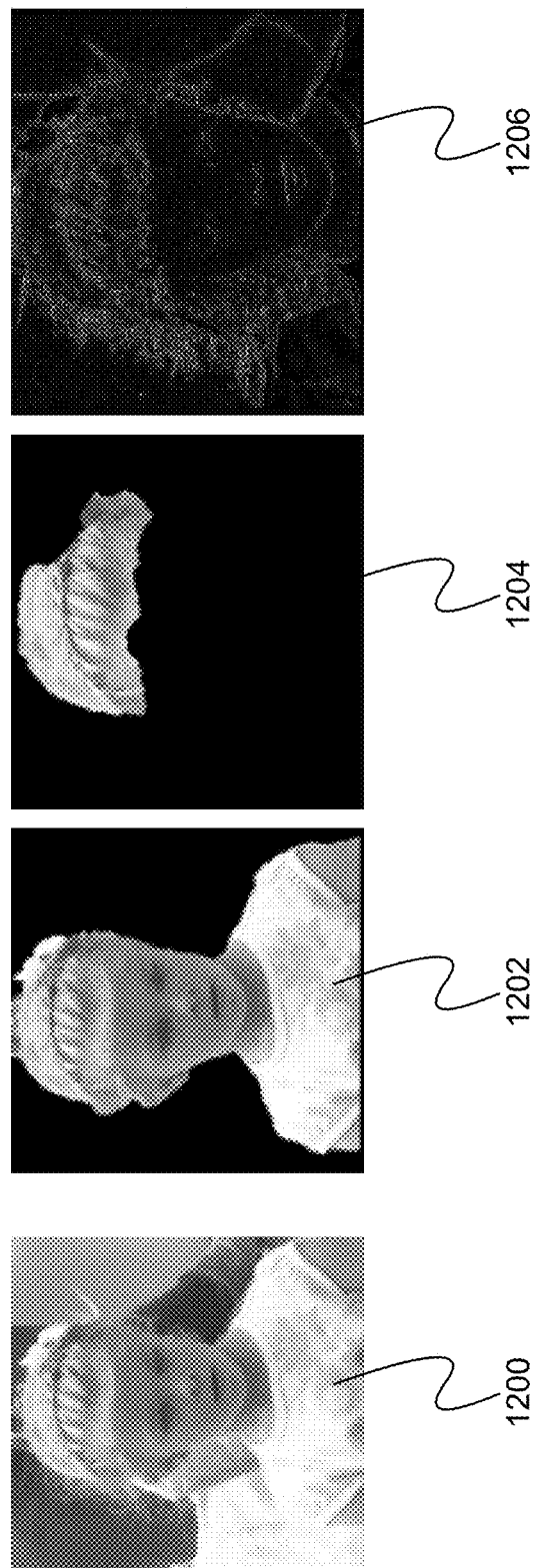
FIG. 12 illustrates images related to generating a mask for thin hair areas according to some embodiments.

FIG. 12 illustrates images related to generating a mask for thin hair areas according to some embodiments. The mask is generated in two steps: a segmentation with "haircut" is conducted to specify the basic hair region, and color and brightness of the haircut are calculated, and then the mask for the curls is calculated. Image 1200 is the original image. Image 1202 is a cropped (haircut) object. Image 1204 includes the hair area to specify the hair color. Image 1206 shows curl mask candidates before removing wrong edges and matching for the hair color.

Figure 13:
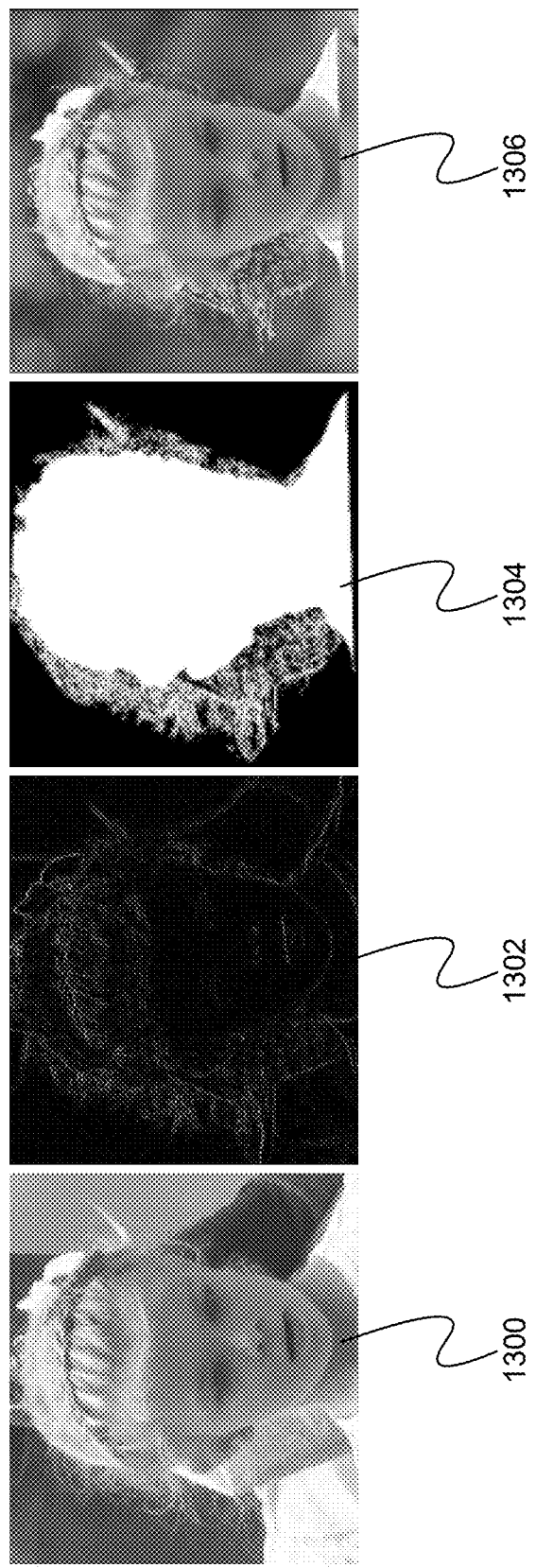
FIG. 13 illustrates images related to thin lines filter-based embedding according to some embodiments.

FIG. 13 illustrates images related to thin lines filter-based embedding according to some embodiments. Image 1300 is the original image. Image 1302 is the thin-line filtered image. Image 1304 is the thin-line filtered image thresholded and added to the object mask. Image 1306 is the object embedded into a different background.

Figure 14:
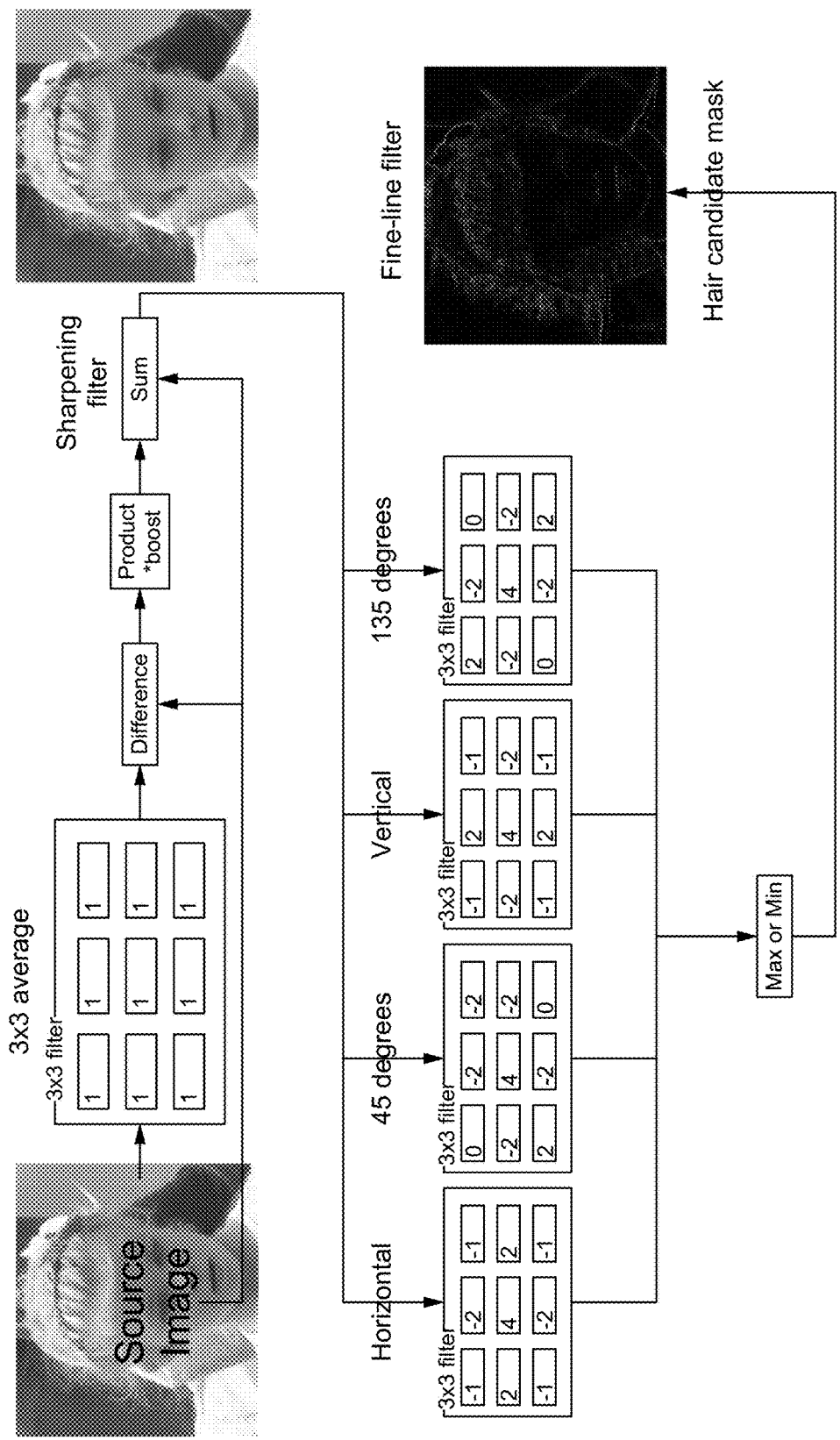
FIG. 14 illustrates a data flow diagram of filters to find thin curls according to some embodiments.

FIG. 14 illustrates a data flow diagram of filters to find thin curls according to some embodiments. A 3×3 average filter is applied to an original image. The difference between the original image and the 3×3 average is determined. A boost is applied to the result which is summed with the original image. The summed image is sent to a set of directional fine-line filters and a max or min is applied to generate a hair candidate mask.

Figure 15:
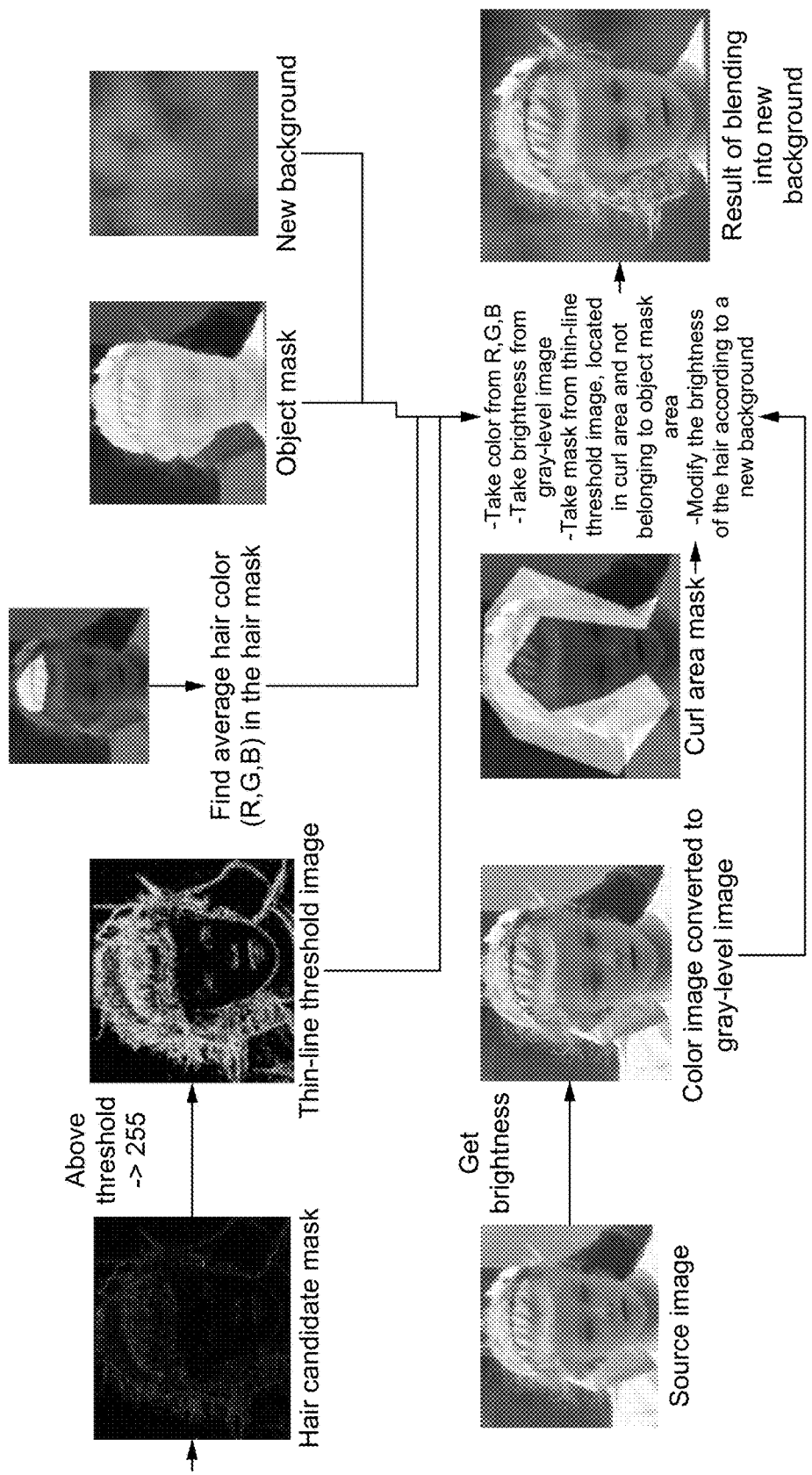
FIG. 15 illustrates a flow diagram of embedding an object into a new background.

FIG. 15 illustrates a flow diagram of embedding an object into a new background. The hair candidate mask is compared with a threshold and a thin-line threshold image is determined. An average hair color (RGB) in the hair mask is determined. Brightness is determined from a source image. The color image is converted to a gray-level image. Color is taken from the average hair color (RGB), brightness is used from the gray-level image, the mask from the thin-line image, located in the curl area not belonging to the object mask area, and the brightness of the hair is modified according to the new background. The result is blended into the new background.

Figure 16:
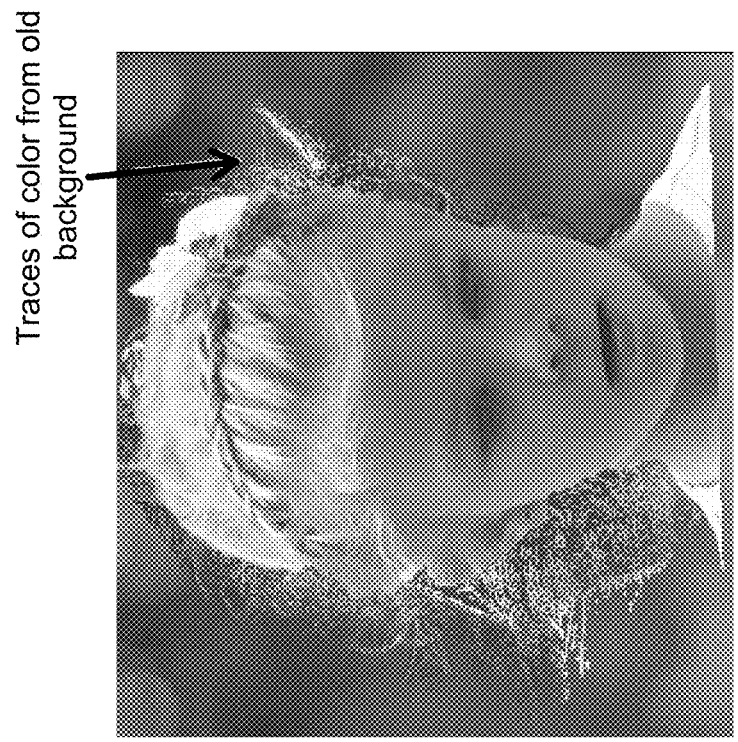
FIG. 16 illustrates artifacts of an old background in a non-adjusted embedding according to some embodiment.
Figure 16:

FIG. 16 illustrates artifacts of an old background in a non-adjusted embedding according to some embodiment.

Figure 17:
FIG. 17 illustrates images related to eliminating traces of color from an old background according to some embodiments.
Figure 17:
Figure 17:

FIG. 17 illustrates images related to eliminating traces of color from an old background according to some embodiments. Image 1700 is an original image. Image 1702 shows no hair color filtering. Image 1704 includes hair color filtering where traces from the old background are eliminated.

For a blending area of the image, it is assumed that the object's transparency, "a" (alpha-parameter) remains constant in different backgrounds. For object intensity, F1, observed in background B1: $F1=(1-a)*h+a*B1$. For object intensity, F2, observed in background B2: $F2=(1-a)*h+a*B2$. Intensity, F2, in the new background is equal to: $F2=F1+a*(B2-B1)$. "h" is object intensity before blending with the background, and "a" is object transparency.

The described approach uses the alpha-parameter "a" which, as experiments show, is able to be safely taken equal to 0.2 for any kind of background. The follow-up 1-ring blending with new background improves the perceptual quality of embedding. The method allows to maintain the original brightness of the curls regardless of the new background.

Figure 18:
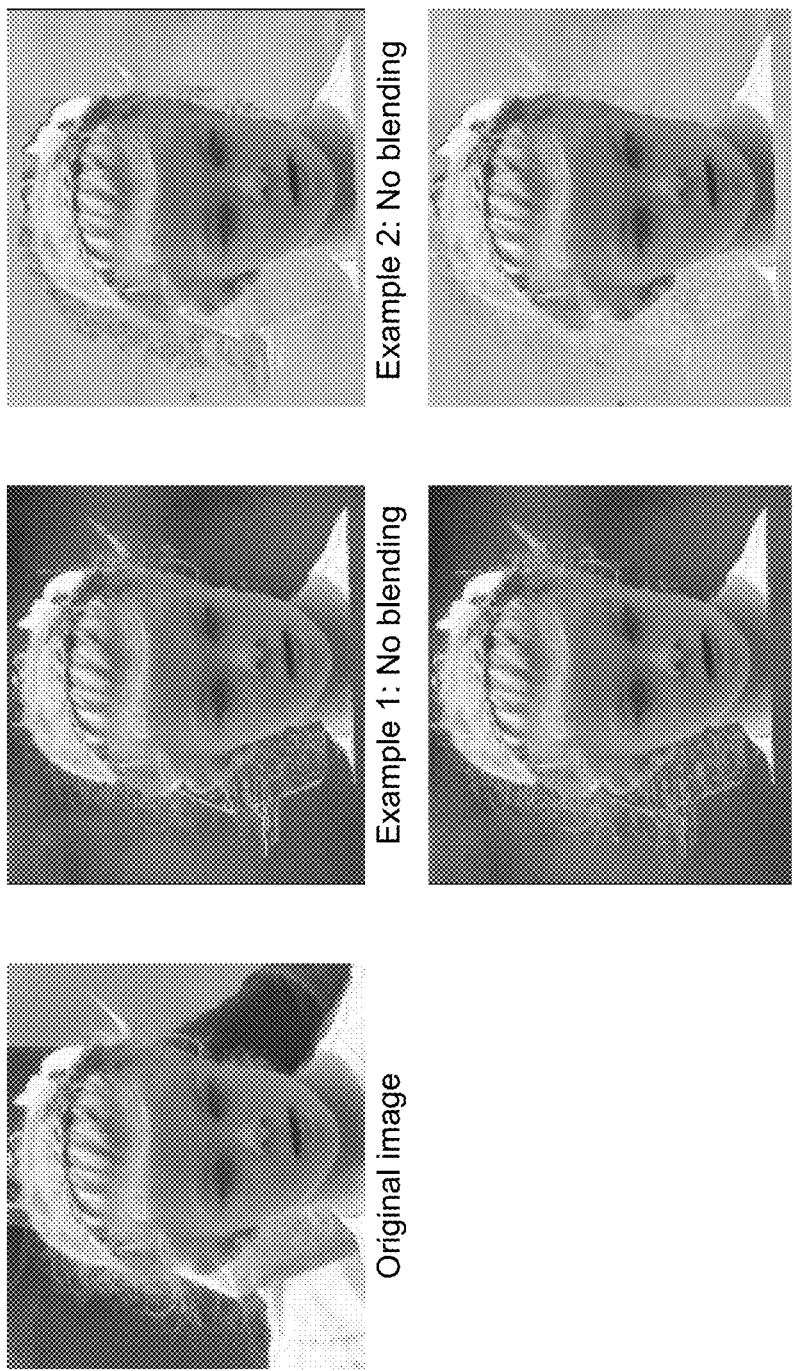
FIG. 18 illustrates images related to curl embedding with backgrounds taken into account according to some embodiments.

FIG. 18 illustrates images related to curl embedding with backgrounds taken into account according to some embodiments.

To expedite the calculation of the object's mask, the original image is downsized. As a result, the obtained object mask looks "jagged" after making the expansion to return back to the original image size.

Figure 19:
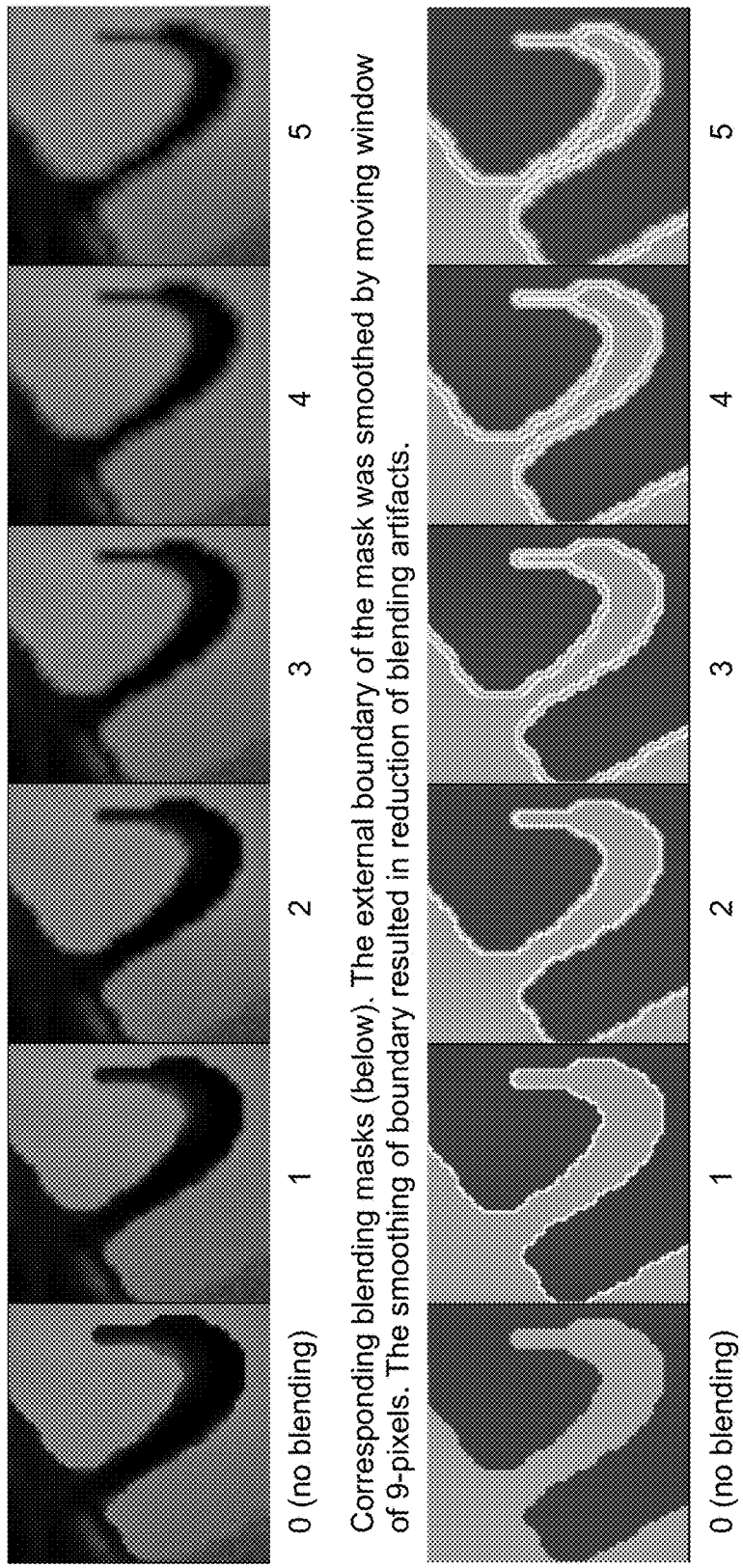
FIG. 19 illustrates images of reducing artifacts of deep blending by smoothing the mask's boundary according to some embodiments.

Smoothing by blending leaves jagged artifacts. Mask smoothing is implemented by finding an external contour of the mask, smoothing the external contour and refilling the mask. FIG. 19 illustrates images of reducing artifacts of deep blending by smoothing the mask's boundary according to some embodiments. The external boundary of the mask is smoothed by a moving window of 9-pixels.

Figure 20:
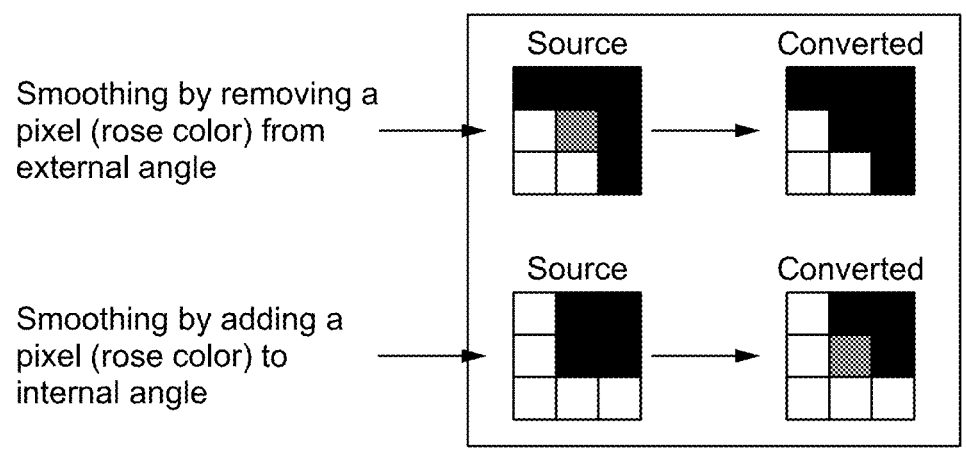
FIG. 20 illustrates a diagram of smoothing an object's mask according to some embodiments.

FIG. 20 illustrates a diagram of smoothing an object's mask according to some embodiments. A 3×3 moving window is used. Mask pixels in the 3×3 window are shown by the white color. In the example, smoothing includes removing a pixel from the external corner and adding a pixel to the internal corner. Each (of two) kernels are repeated with 0, 90, 180, 270 degrees of rotation, so there are 8 kernels.

Figure 21:
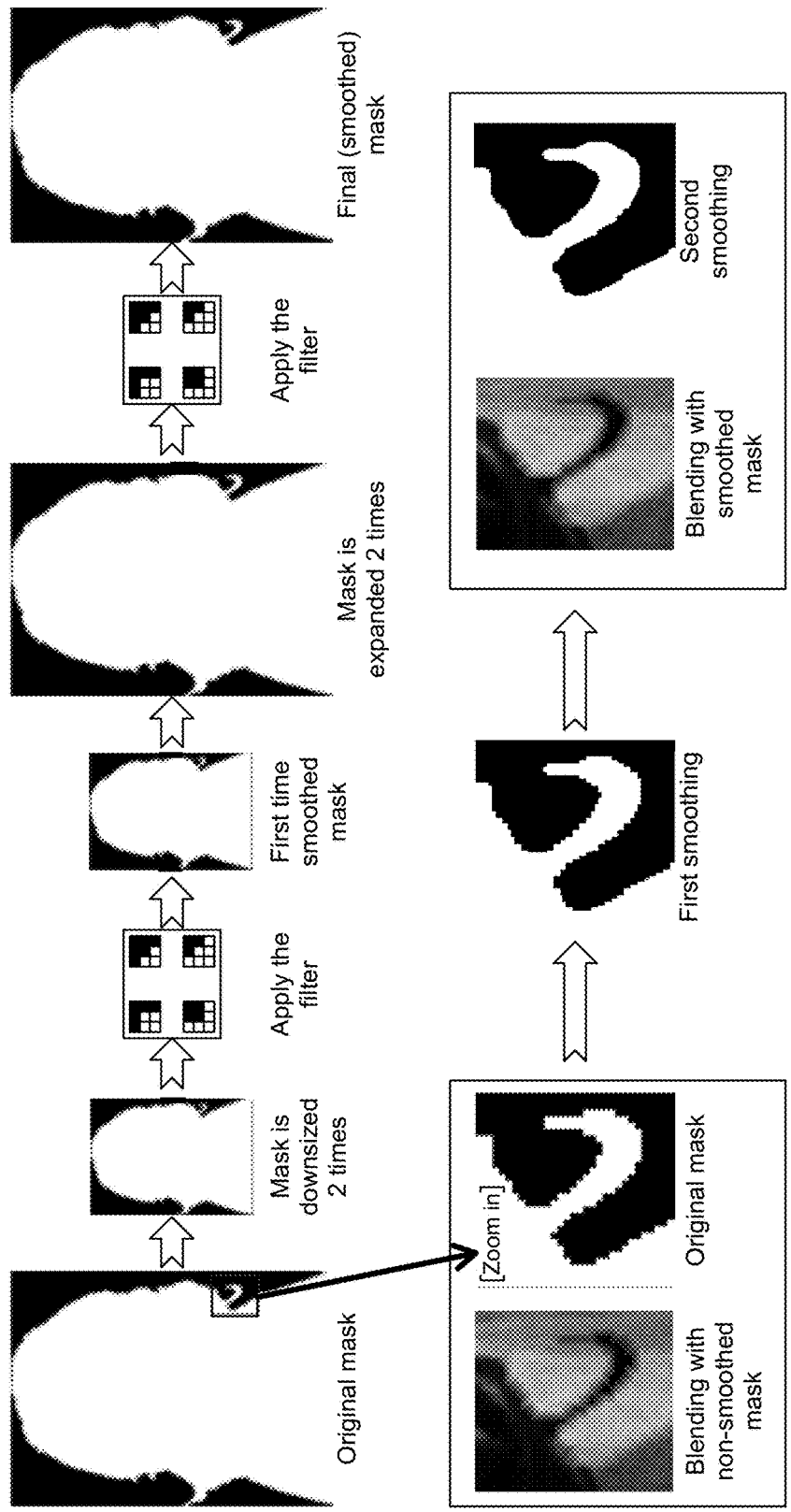
FIG. 21 illustrates a flow diagram of two-step smoothing of the object's mask according to some embodiments.

FIG. 21 illustrates a flow diagram of two-step smoothing of the object's mask according to some embodiments. The original mask is downsized. The filter is applied, which smoothes the image. The mask is expanded. The filter is applied again which produces a final smoothed mask.

Figure 22:
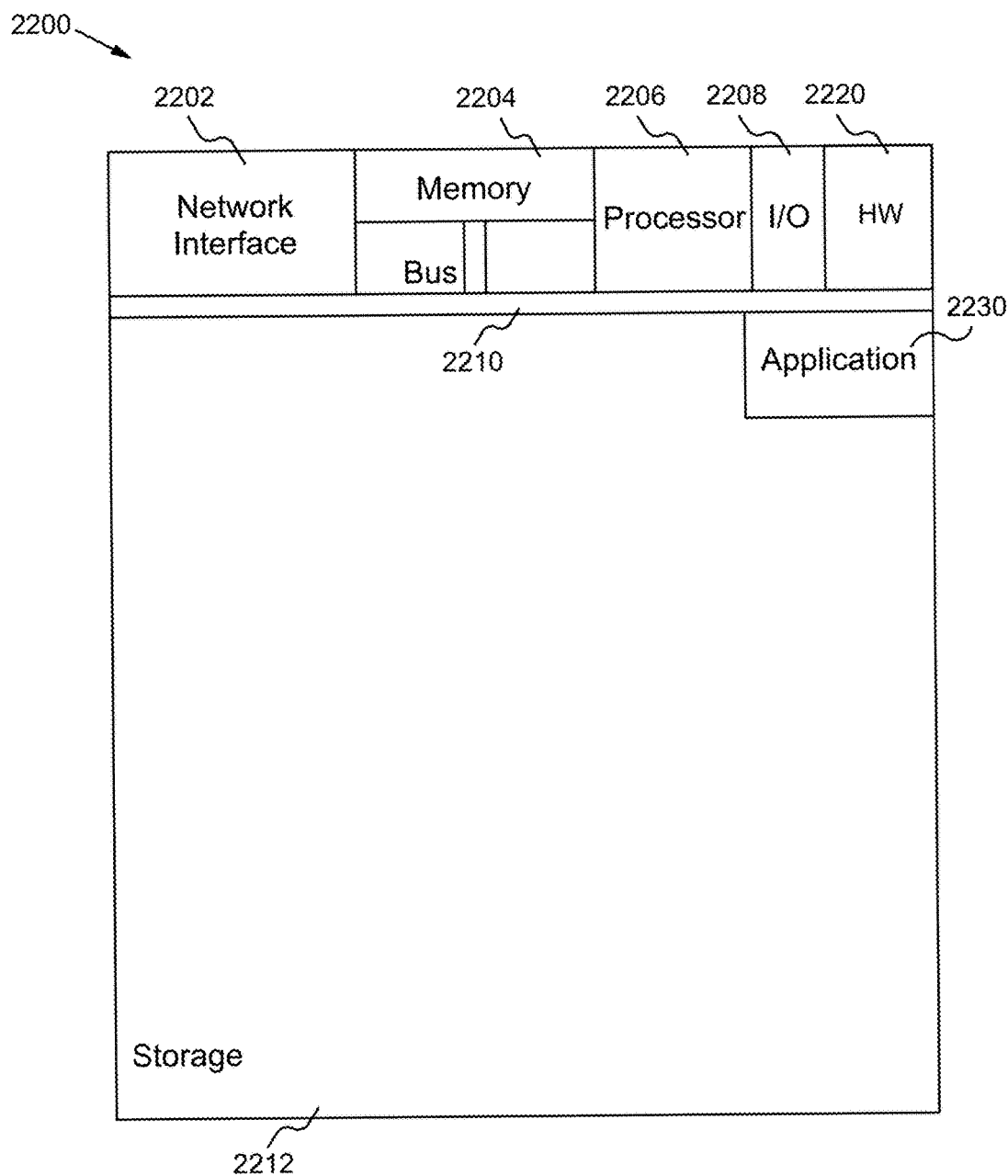
FIG. 22 illustrates a block diagram of an exemplary computing device configured to implement the embedding and blending method according to some embodiments.

FIG. 22 illustrates a block diagram of an exemplary computing device configured to implement the embedding and blending method according to some embodiments. The computing device 2200 is able to be used to acquire, store, compute, process, communicate and/or display information such as images and videos. In general, a hardware structure suitable for implementing the computing device 2200 includes a network interface 2202, a memory 2204, a processor 2206, I/O device(s) 2208, a bus 2210 and a storage device 2212. The choice of processor is not critical as long as a suitable processor with sufficient speed is chosen. The memory 2204 is able to be any conventional computer memory known in the art. The storage device 2212 is able to include a hard drive, CDROM, CDRW, DVD, DVDRW, High Definition disc/drive, ultra-HD drive, flash memory card or any other storage device. The computing device 2200 is able to include one or more network interfaces 2202. An example of a network interface includes a network card connected to an Ethernet or other type of LAN. The I/O device(s) 2208 are able to include one or more of the following: keyboard, mouse, monitor, screen, printer, modem, touchscreen, button interface and other devices. Embedding and blending method application(s) 2230 used to implement the embedding and blending method are likely to be stored in the storage device 2212 and memory 2204 and processed as applications are typically processed. More or fewer components shown in FIG. 22 are able to be included in the computing device 2200. In some embodiments, embedding and blending method hardware 2220 is included. Although the computing device 2200 in FIG. 22 includes applications 2230 and hardware 2220 for the embedding and blending method, the embedding and blending method is able to be implemented on a computing device in hardware, firmware, software or any combination thereof. For example, in some embodiments, the embedding and blending method applications 2230 are programmed in a memory and executed using a processor. In another example, in some embodiments, the embedding and blending method hardware 2220 is programmed hardware logic including gates specifically designed to implement the embedding and blending method.

In some embodiments, the embedding and blending method application(s) 2230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the embedding and blending method described herein, a device such as a digital camera/camcorder is used to acquire image/video content. The embedding and blending method is automatically used to move an object in the image or video. The embedding and blending method is able to be implemented automatically without user involvement.

In operation, the embedding and blending method is able to be used as an image processing software application, suitable for the use in smart phones, notebooks, computers, game consoles and a portion of the image processing packet, for example. In some embodiments, the embedding and blending method is combined with scene analysis, automated object-of-interest finding and inpainting methods. The combined method is able to be used as a stand-alone application for the automated object delineation and its subsequent transfer and embedding into a different photo.

Some Embodiments of Automated Embedding and Blending Head Images

1. A method of automatically transferring an object from a first location to a second location programmed in a non-transitory memory of a device comprising:
   a. automatically delineating the object including recognizing a hairless portion of the object, followed by delineating a whole hair area; and
   b. automatically blending the object into a new background.
2. The method of clause 1 wherein the hairless portion of the object includes a face and a neck area.
3. The method of clause 1 wherein recognizing the hairless portion of the object includes determining positions of eyes, nose, mouth and chin to separate a face-neck area from a hair area.
4. The method of clause 1 wherein delineating the object includes identifying a hair area by conducting calculations from a face-neck area outward.
5. The method of clause 1 wherein delineating the object includes repeatedly modifying a hair template to adjust to local hair properties.
6. The method of clause 1 wherein delineating the object includes continuing hair recognition steps until a whole extent of hair, including hair curls, is found.
7. The method of clause 1 wherein blending the object into the new background includes utilizing a hair mask.
8. The method of clause 7 wherein blending the object into the new background includes smoothing the hair mask.
9. A system for automatically transferring an object from a first location to a second location programmed in a non-transitory memory of a device comprising:
   a. an acquiring device configured for acquiring an image; and
   b. a processing device configured for:
      i. automatically delineating the object including recognizing a hairless portion of the object; and
      ii. automatically blending the object into a new background to generate a modified image; and
   c. a display device configured for displaying the modified image.
10. The system of clause 9 wherein the hairless portion of the object includes a face and a neck area.
11. The system of clause 9 wherein recognizing the hairless portion of the object includes determining positions of eyes, nose, mouth and chin to separate a face-neck area from a hair area.
12. The system of clause 9 wherein delineating the object includes identifying a hair area by conducting calculations from a face-neck area outward.
13. The system of clause 9 wherein delineating the object includes repeatedly modifying a hair template to adjust to local hair properties.
14. The system of clause 9 wherein delineating the object includes continuing hair recognition steps until a whole extent of hair, including hair curls, is found.
15. The system of clause 9 wherein blending the object into the new background includes utilizing a hair mask.
16. The system of clause 15 wherein blending the object into the new background includes smoothing the hair mask.
17. An apparatus comprising:
   a. a non-transitory memory for storing an application, the application for:
      i. automatically delineating an object including recognizing a hairless portion of the object; and
      ii. automatically blending the object into a new background to generate a modified image;
   b. a processing component coupled to the memory, the processing component configured for processing the application; and
   c. a display device configured for displaying the modified image.
18. The apparatus of clause 17 wherein the hairless portion of the object includes a face and a neck area.
19. The apparatus of clause 17 wherein recognizing the hairless portion of the object includes determining positions of eyes, nose, mouth and chin to separate a face-neck area from a hair area.
20. The apparatus of clause 17 wherein delineating the object includes identifying a hair area by conducting calculations from a face-neck area outward.
21. The apparatus of clause 17 wherein delineating the object includes repeatedly modifying a hair template to adjust to local hair properties.
22. The apparatus of clause 17 wherein delineating the object includes continuing hair recognition steps until a whole extent of hair, including hair curls, is found.
23. The apparatus of clause 17 wherein blending the object into the new background includes utilizing a hair mask.
24. The apparatus of clause 23 wherein blending the object into the new background includes smoothing the hair mask.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of automatically transferring an object from a first location to a second location programmed in a non-transitory memory of a device comprising:
   a. automatically delineating the object including recognizing a hairless portion of the object, followed by delineating a whole hair area, wherein delineating the object includes identifying a hair area by finding super-pixels in a head-hair area, sorting the super-pixels by size, sorting a set of largest super-pixels by distance from a head center and classifying the super-pixels; and
b. automatically blending the object into a new background, wherein delineating the object includes repeatedly modifying a hair template to adjust to local hair properties.

2. The method of claim 1 wherein the hairless portion of the object includes a face and a neck area.

3. The method of claim 1 wherein recognizing the hairless portion of the object includes determining positions of eyes, nose, mouth and chin to separate a face-neck area from the hair area.

4. The method of claim 1 wherein delineating the object includes identifying the hair area by conducting calculations from a face-neck area outward.

5. The method of claim 1 wherein delineating the object includes continuing hair recognition steps until a whole extent of hair, including hair curls, is found.

6. The method of claim 1 wherein blending the object into the new background includes utilizing a hair mask.

7. The method of claim 6 wherein blending the object into the new background includes smoothing the hair mask.

8. A system for automatically transferring an object from a first location to a second location programmed in a non-transitory memory of a device comprising:
a. an acquiring device configured for acquiring an image; and
b. a processing device configured for:
  i. automatically delineating the object including recognizing a hairless portion of the object, wherein delineating the object includes identifying a hair area by finding super-pixels in a head-hair area, sorting the super-pixels by size, sorting a set of largest super-pixels by distance from a head center and classifying the super-pixels; and
  ii. automatically blending the object into a new background to generate a modified image, wherein delineating the object includes repeatedly modifying a hair template to adjust to local hair properties; and
c. a display device configured for displaying the modified image.

9. The system of claim 8 wherein the hairless portion of the object includes a face and a neck area.

10. The system of claim 8 wherein recognizing the hairless portion of the object includes determining positions of eyes, nose, mouth and chin to separate a face-neck area from the hair area.

11. The system of claim 8 wherein delineating the object includes identifying the hair area by conducting calculations from a face-neck area outward.

12. The system of claim 8 wherein delineating the object includes continuing hair recognition steps until a whole extent of hair, including hair curls, is found.

13. The system of claim 8 wherein blending the object into the new background includes utilizing a hair mask.

14. The system of claim 13 wherein blending the object into the new background includes smoothing the hair mask.

15. An apparatus comprising:
a. a non-transitory memory for storing an application, the application for:
  i. automatically delineating an object including recognizing a hairless portion of the object, wherein delineating the object includes identifying a hair area by finding super-pixels in a head-hair area, sorting the super-pixels by size, sorting a set of largest super-pixels by distance from a head center and classifying the super-pixels; and
  ii. automatically blending the object into a new background to generate a modified image, wherein delineating the object includes repeatedly modifying a hair template to adjust to local hair properties;
b. a processing component coupled to the memory, the processing component configured for processing the application; and
c. a display device configured for displaying the modified image.

16. The apparatus of claim 15 wherein the hairless portion of the object includes a face and a neck area.

17. The apparatus of claim 15 wherein recognizing the hairless portion of the object includes determining positions of eyes, nose, mouth and chin to separate a face-neck area from the hair area.

18. The apparatus of claim 15 wherein delineating the object includes identifying the hair area by conducting calculations from a face-neck area outward.

19. The apparatus of claim 15 wherein delineating the object includes continuing hair recognition steps until a whole extent of hair, including hair curls, is found.

20. The apparatus of claim 15 wherein blending the object into the new background includes utilizing a hair mask.

21. The apparatus of claim 20 wherein blending the object into the new background includes smoothing the hair mask.

* * * * *